United States Patent
Wu et al.

(10) Patent No.: US 8,082,000 B2
(45) Date of Patent: Dec. 20, 2011

(54) METHOD OF SELECTING A PRIVATE CELL FOR PROVIDING COMMUNICATION TO A COMMUNICATION DEVICE AND A COMMUNICATION DEVICE

(75) Inventors: Jian Jun Wu, Reading (GB); Howard Benn, Swindon (GB); Hao Bi, Lake Zurich, IL (US); Scott Droste, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 456 days.

(21) Appl. No.: 12/464,189

(22) Filed: May 12, 2009

(65) Prior Publication Data

US 2010/0291927 A1 Nov. 18, 2010

(51) Int. Cl.
*H04B 7/00* (2006.01)
(52) U.S. Cl. .......... 455/525; 455/555
(58) Field of Classification Search .......... 455/435.2, 455/525, 555, 404.2, 435.3, 450, 452.2, 445, 455/432.1, 432.5, 554.1, 34.1, 53.1, 54.1, 455/423
See application file for complete search history.

(56) References Cited

U.S. PATENT DOCUMENTS 6,826,414 B1 * 11/2004 Reynolds et al. .......... 455/555

OTHER PUBLICATIONS

3GPP TS 22.220 V9.0.0 (Mar. 2009); 3rd Generation Partnership Project; Technical Specification Group Services and System Aspects; Service Requirements for Home NodeBs and Home eNodeBs; (Release 9).
3GPP TS 24.301 V8.1.0 (Mar. 2009); 3rd Generation Partnership Project; Technical Specification Group Core Network and Terminals; Non-Access-Stratum (NAS) Protocol for Evolved Packet System (EPS); Stage 3 (Release 8).
3GPP TSG-Sa1 #44; San Antonio, Texas, USA Feb. 2-6, 2009; Home Network Independent Support of Roamers in CSG; S1-090104.

* cited by examiner

*Primary Examiner* — Joseph Lauture
(74) *Attorney, Agent, or Firm* — Roland K. Bowler, II; Sarah Gibson

(57) ABSTRACT

A method of selecting a private cell for providing communication to a communication device (222) in a communication system (200) comprising a plurality of private cells (202, 204, 206, 208) comprises identifying (400) private cells available to the communication device for establishing communication, determining (402) a priority value from a plurality of priority values for each of the identified private cells for the communication device, and selecting (404) a private cell for providing communication from the identified private cells according to the determined priority values of the identified private cells. Each private cell may be associated with a predetermined type of private cell for the communication device. The priority values for each of the identified private cells may then be determined according to the predetermined type associated with the identified private cell. A method of synchronising a priority value of a private cell determined by the communication device with a priority value of the private cell determined by a network (218) is also disclosed.

19 Claims, 10 Drawing Sheets

METHOD OF SELECTING A PRIVATE CELL FOR PROVIDING COMMUNICATION TO A COMMUNICATION DEVICE AND A COMMUNICATION DEVICE

FIELD OF THE DISCLOSURE

This disclosure relates to a method of selecting a private cell for providing communication to a communication device according to priority values of identified private cells and a communication device.

BACKGROUND OF THE DISCLOSURE

3rd generation (3G) systems, such as the Universal Mobile Telecommunication System (UMTS) have been developed and deployed to further enhance the communication services provided to mobile users compared to those communication services provided by the 2nd generation (2G) communication system known as the Global System for Mobile communication (GSM).

As is well known, cellular communication systems, such UMTS, provide communication to mobile devices via a plurality of cells, with each cell served by one or more base stations. The base stations are interconnected by a fixed network which can communicate data between the base stations. A mobile device communicates via a radio communication link with a base station of the cell within which the mobile station is situated. In UMTS, the base stations which are part of the UTRAN are known as Node Bs and a mobile device is known as User Equipment (UE).

In order to extend coverage and capacity indoors, such as in residential or commercial or small business environments and especially where access would otherwise be limited or unavailable, systems with smaller sized cells served by small base stations, known as femtocells, have been developed. The femtocell incorporates the functionality of a typical base station and some network functionality to allow a simpler, self contained implementation. Current femtocell designs can typically support two to four active mobile devices in a residential setting and thus, are typically used for a closed subscriber group (CSG) or private cell where only subscribers in the group may communicate via the femtocell (also known as private base station). Different architectures for femtocells have been proposed. For example, a UMTS femtocell architecture contains a Home Node B (HNB), and a 3G HNB Gateway (3G HNB GW), which interfaces with the UMTS Packet Switched (PS) and Circuit Switched (CS) domains. The third Generation Partnership Project (3GPP) refers to a 3G femtocell that connects a 3GPP UE to a core network over UTRAN as a Home Node B (HNB) and is working currently to complete a new HNB standard for Rel-8 of specifications: see for example, the 3GPP document TS 25.467 (UTRAN Architecture for 3G HNB).

3GPP has defined an architecture to support access to the PS domain and to the CS domain of one or more core networks through HNBs. FIG. 1 is a simplified diagram showing one HNB 10 serving a private cell 12, and a Node B (NB) 14 serving a larger cell 16 (referred to as a macro cell). UE 13 communicates with the HNB 10 over a radio communication link 15 and the HNB 10 communicates with a 3G HNB gateway 18 via a Iuh interface 20. NB 14 is coupled to Radio Network Controller (RNC) 22 as is well known in the art. Services are provided to the UE 13 via the CS domain 23 using the Iu-cs interface and the Mobile Switching Centre (MSC) 24. IP services are provided to the UE 13 via the PS domain 25 using the Iu-ps interface and the Serving GPRS Support Node (SGSN) 26 and the Gateway GPRS Support Nodes (GGSN) or Packet Data Network Gateway (PGW) 28. For UEs having IP Multimedia Subsystem (IMS) capability, access to IMS services may be provided using IMS elements of the IMS 27, the Iu-ps interface and the SGSN 26 and the GGSN/PGW 28.

In addition, 3GPP is working to specify an enhanced HNB architecture in the context of Rel-9: see for example, the 3GPP document TS 22.220, the disclosure of which is incorporated herein by reference.

In the enhanced HNB architecture, access to 3G and evolved 3G (EPS) services may be provided by a Public Land Mobile Network (PLMN) by means of HNBs and Home evolved Node Bs (HeNBs) which are jointly referred to as H(e)NB. A HeNB is a 3G femtocell that connects a 3GPP UE over an Evolved UTRAN (EUTRAN) wireless air interface to a core network using, for example, a broadband IP backhaul, such as the internet connections available in homes through cable or Digital Subscriber Lines (DSL).

In a PLMN communication system, there may be a number of CSG cells and all the H(e)NBs (and hence the CSG cells) serving the same CSG share the same unique (within the PLMN) identity called the CSG Identity. TS 22.220, Section 5.5.4, states that the UE shall contain a network (e.g. operator) controlled list of allowed CSG Identities (referred to as the Allowed CSG list) which list identifies those CSG cells to which the UE is allowed access. In addition, TS 22.220 states that the UE shall contain a user controlled list of allowed CSG Identities (referred to as the User CSG list) which list identifies the allowed CSG cells which have been selected by the user. For example, the user controlled list may include the user's home CSG cell or the user's most frequently used CSG cells.

As the UE moves into and out of CSG cells and between neighbouring CSG cells when in idle mode (i.e. when the UE is active with (that is, registered to) the PLMN but no communication resources have been allocated to the UE) or on turn on of the UE, it may be necessary to select a 'new' 0 CSG cell for communication and to register the UE on a PLMN via the H(e)NB serving the 'new' CSG cell. CSG cell (re)selection may be performed by standard automatic network selection procedures which typically use the radio signal strength to select a suitable 'new' CSG cell, which is preferably a CSG cell whose CSG Identity is in the Allowed CSG list or the User CSG list.

Using normal cellular cell reselection criteria with consideration of radio signal strength works well for reselection of macro cells in current cellular systems because the macro cells of the cellular systems are well planned and optimised. Using radio signal strength only as a reselection criteria also works well with WLAN with manual selection because as long as the radio signal strength is above a threshold, the UE will stick to the WLAN. For CSG cell selection, due to the fact that the coverage of the CSG cells is typically not well planned from a radio perspective compared to macro cells of a cellular system, selecting a 'new' CSG cell based on radio signal strength may not result in the preferred CSG cell of a user being selected.

For example, in a block of flats there may be several CSG cells with overlapping coverage and with transmitters transmitting at different powers, and the home CSG cell may not provide the strongest radio signal in all rooms of the user's home flat. Thus, by selecting a CSG cell based on radio signal strength, the UE, even when the user is at home, may end up being registered to a neighbour's CSG cell rather than the preferred home CSG cell. The home CSG cell is typically the preferred CSG cell due to lower billing rates and the fact that the user can use the local services provided via the home CSG cell (e.g. local printer on home network). Thus, with current reselection criteria based on radio signal strength, a UE when at the user's home may select a neighbours CSG cell at a higher billing rate.

Selection of a CSG cell may also be performed manually by a user. In this case, the user can request the UE to perform a scan for available CSG Identities. When such a request is received the UE performs a scan for available CSG cells, and their CSG Identities. Following the scan, the CSG Identities of the available CSG cells are displayed on the UE display. An indication is given to the user as to which of the available CSG Identities is contained in the Allowed CSG list or the User CSG list. TS 22.220, Section 5.5.4, specifies that the available CSG Identities shall be displayed in the following order:

The CSG Identities that are contained in the User CSG list.
The CSG Identities that are contained in the Allowed CSG List.
Any other CSG Identity not included in the Allowed CSG List or User CSG list.

The user may then select an entry in the list, and in response to the selection, the UE may reselect any of the available CSG cells with the CSG Identity chosen by the user and attempt to establish communication with that CSG cell.

Since the user may be presented with several lists of CSG Identities, the display of lists in this way in order to enable a user to select a CSG cell is not particularly user friendly.

In addition, since the billing rates or subscription offerings may vary significantly between different CSG cells of the CSG Identities, even between CSG Identities in the same list, even prioritising between the different lists (e.g. the User CSG list and the Allowed CSG list) does not enable the preferred CSG Identity for a user to be easily determined.

For example, in the case of an airport location having a CSG owned by an airline and CSG owned by a restaurant, the CSG Identities of both these CSGs may be included in the User CSG list through manual selection. As there is often a revenue sharing agreement between the CSG owner and network operator, a CSG owner may want to motivate more uses of their HeNB by having some rebate/reward point program. For example, the airline may advertise the more a user uses their CSG, the more frequent flier miles the user can earn. So in this case a user may prefer to use the airline CSG over the restaurant CSG. However, as discussed above, the user is merely presented with a list of the CSG Identities in the User CSG list which does not make it easy to select a preferred CSG.

BRIEF DESCRIPTION OF THE DRAWINGS

A method of selecting a private cell for providing communication to a communication device and a communication device in accordance with the disclosure will now be described, by way of example only, with reference to the accompanying drawings in which.

DETAILED DESCRIPTION OF THE DRAWINGS

The term service as used herein is intended to cover services for the end user of a communication device (e.g. originated or terminated at the communication device) and includes voice calls, video, audio or other multimedia sessions, file delivery services, bulletin board and broadcast notification services like news feed, web-surfing, network gaming, database access, email, SMS or similar services which provide the capability for information transfer. The disclosure will however be described in relation to voice calls for illustrative purposes.

The communication device may be a portable or handheld or mobile telephone, a Personal Digital Assistant (PDA), a portable computer, portable television and/or similar mobile device or other similar communication device. In the following description, the communication device will be referred to generally as a UE for illustrative purposes and it is not intended to limit the disclosure to any particular type of communication device.

Figure 1:
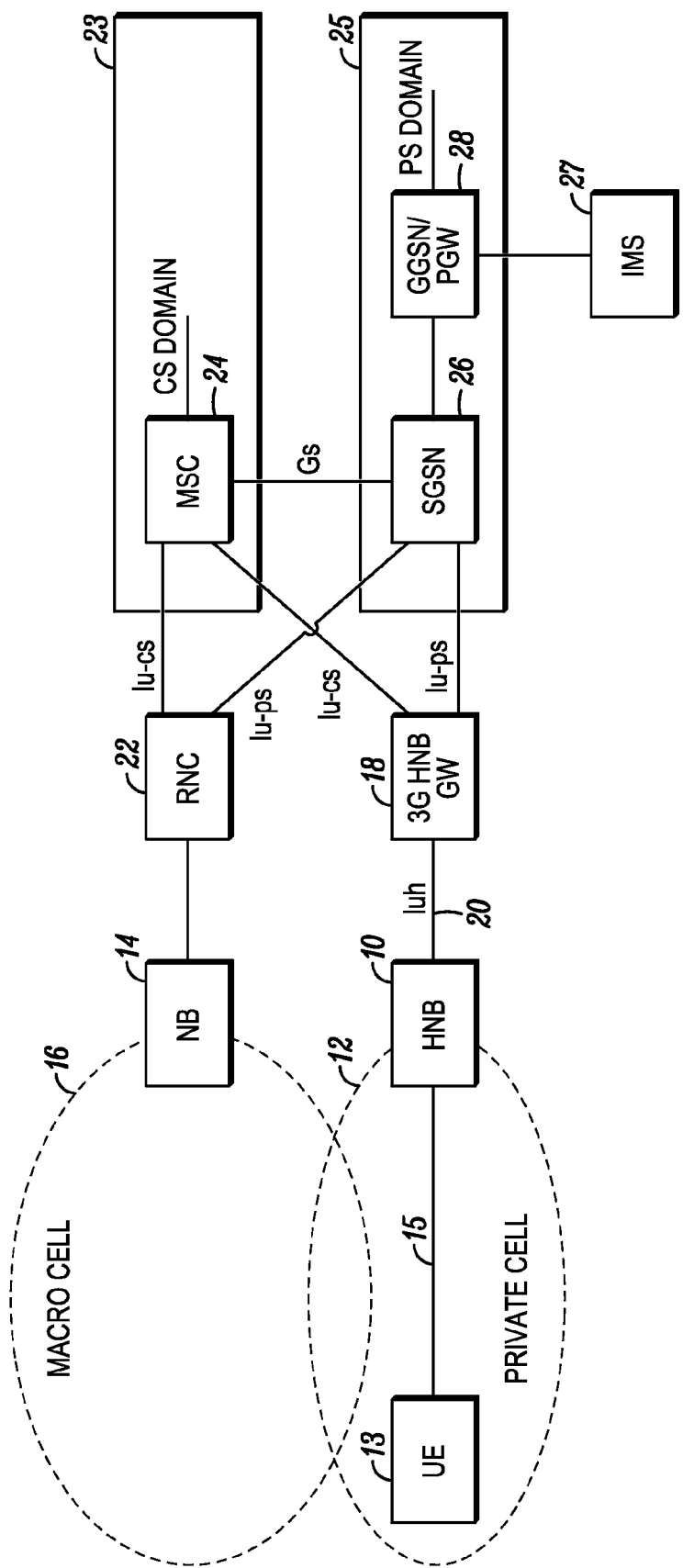
FIG. 1 is a block schematic diagram of a communication system including a Node B and a HNB for providing access to networks.
Figure 2:
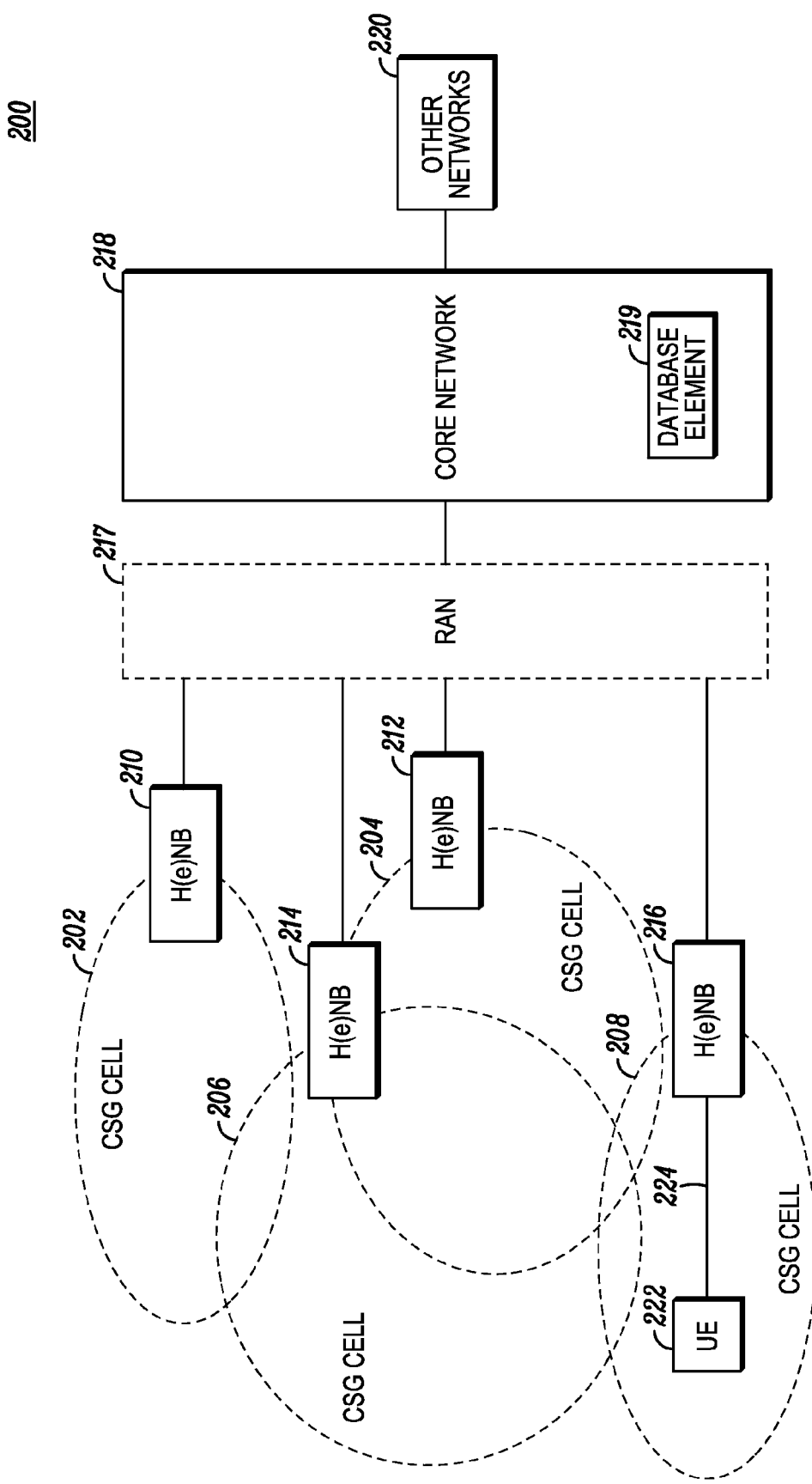
FIG. 2 is a block schematic diagram of a communication system in accordance with an example embodiment of the present disclosure.

Referring now to FIG. 2, a communication system 200 in accordance with an example of an embodiment of the disclosure comprises a plurality of private cells 202, 204, 206, 208, with each private cell being served by a private base station 210, 212, 214, 216 communicatively coupled to a core network 218 via at least one RAN identified by the dotted line box 217 in FIG. 2 as is well known in the art.

A UE 222 communicates with the private base station 216 via a radio communication link 224 when the UE 222 is in the private cell 208 served by the private base station 216. The private base station 216 may be a HNB which is part of a UTRAN or a HeNB which is part of a EUTRAN as defined in the 3GPP standards with the private cell 208 being a Closed Subscriber Group (CSG) cell. Other parts of the RAN(s), such as Node Bs and Radio Network Controllers (RNC) for serving macro cells, are not shown in FIG. 2 for simplicity. Typically, in order for the user of the UE 222 to be able to use the private base station 216, the user must be a subscriber to the CSG to which the private base station 216 is associated. However for certain types of CSG cells as will be explained below, a UE does not need to be a subscriber to the CSG associated with a CSG cell in order to use the CSG cell. In the following to simplify the description, the private cells 202, 204, 206, 208 are referred to as CSG cells 202, 204, 206, 208 and the private base stations 210, 212, 214, 216 are referred to as H(e)NBs. It will however be appreciated that the use of this language is not intending to limit the scope of the disclosure.

The core network 218 is communicatively coupled to one or more networks 220, such as a packet data network, a CS network, an IMS network, and manages the RAN(s) 217 in order to provide services to or from a UE. The services may include IMS services from an IMS network or data services from a packet data network. The core network 218 is divided into a plurality of domains including a CS domain, and a PS domain and includes network elements such as Mobile Switching Centres (MSCs), a Home Location Register (HLR), visitor Location Registers (VLR), a Serving GPRS Support Node (SGSN) and a Gateway GPRS Support Nodes (GGSN) or Packet Data Network Gateway (PGW) as is well known in the art and which are not shown in FIG. 2 for simplicity.

The number and types of networks available to a UE is determined by what networks are deployed by the operator of the communication system 200. So, for example, an operator may not deploy a PS network.

In a PLMN communication system, there may be a number of CSG cells of different types with the type of a CSG cell depending on the operating mode of the H(e)NB for a UE which serves the CSG cell. The type of a CSG cell is defined in TS 22.220 in section 5.4.1 as being an indicator provided by the UE that is configured by the operator. The type of the CSG cell for a UE allows additional information to be provided to the user, for example, information on the applied billing regime to be given to the user. Thus, the type of a CSG cell for a UE may include, for example, a closed type CSG cell which operates as a CSG cell to which only authorised UEs may have access; an open type CSG cell which operates as a normal cell (i.e. a non-CSG cell to which any UE can have access); a hybrid type CSG cell which operates as a CSG cell (i.e. to which only authorised UEs may have access) and at the same time, non-CSG UEs are allowed access, for example, when there is spare capacity; and a home type CSG cell with the H(e)NB in the UE owner's home. The billing regime or rate for a user will vary for the different types of CSG cell, with the home CSG cell typically having the lowest billing rate. Other types of CSG cell may include types defined according to the Quality Of Service (QOS) provided by the H(e)NB or some other functionality or capability of the H(e)NB.

In the example communication system 200 shown in FIG. 2, CSG cell 208 may be a home type CSG cell for UE 222 served by a H(e)NB 216 located in the home of a user. The H(e)NB 216 is connected to a home based network (not shown) which may be an IP based network and may include local devices, such as a printer. CSG cell 206 may be an open type CSG cell covering a wider area than the other CSG cells 202, 204 and 208. The H(e)NB 214 serving CSG cell 206 transmits at a higher power in view of the larger coverage area. The other CSG cells 202 and 204 may be closed type CSG cells. A user may have a fixed rate contract for accessing services via the home CSG cell 208 whereas when accessing a service via a neighbouring CSG cell, such as cell 204, a user may be charged at a higher rate as a visitor.

Figure 3:
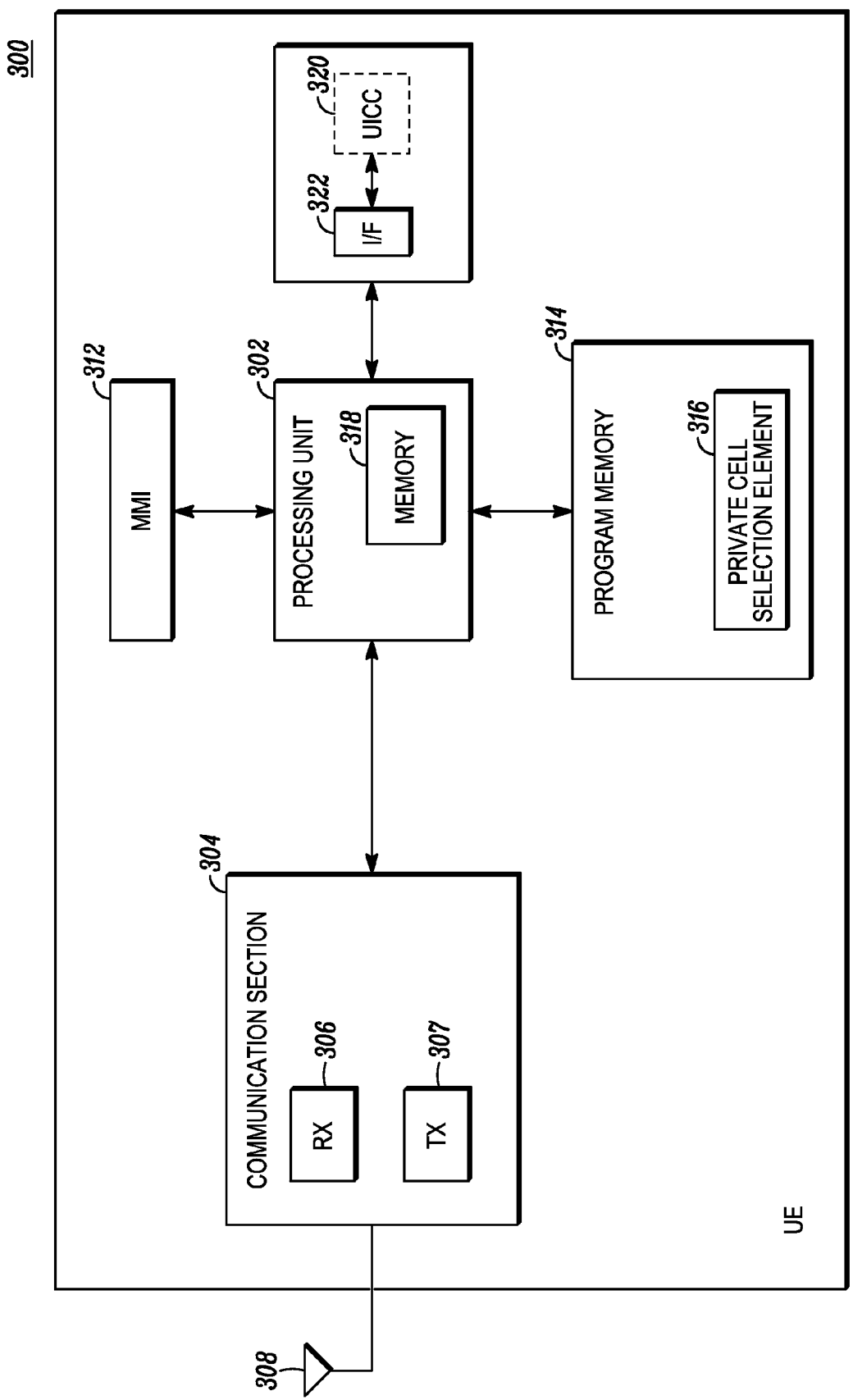
FIG. 3 is a block schematic diagram of a communication device in accordance with an example embodiment of the present disclosure.

FIG. 3 is a block diagram of a communication device 300, such as the UE 222 shown in FIG. 2, in accordance with an embodiment of the disclosure. In the following description, reference is made to a communication device comprising a UE. As will be apparent to a skilled person, FIG. 3 shows only the main functional components of an exemplary UE 300 that are necessary for an understanding of the invention.

The UE 300 comprises a processing unit 302 for carrying out operational processing for the UE 300. The UE 300 also has a communication section 304 for providing wireless communication via a radio communication link with a serving base station such as H(e)NB 216 of FIG. 2. The communication section 304 typically includes an antenna 308, a receiver 306, a transmitter 307, modulation/demodulation section (not shown), and a coding/decoding section (not shown), for example, as will be known to a skilled person and thus will not be described further herein. The communication section 304 is coupled to the processing unit 302.

The UE 300 also has a Man Machine Interface MMI 312, including elements such as a key pad, microphone, speaker, display screen, for providing an interface between the UE and the user of the UE. The MMI 312 is also coupled to the processing unit 302.

The processing unit 302 may be a single processor or may comprise two or more processors carrying out all processing required for the operation of the UE 300. The number of processors and the allocation of processing functions to the processing unit is a matter of design choice for a skilled person. The UE 300 also has a program memory 314 in which is stored programs containing processor instructions for operation of the UE 300. The programs may contain a number of different program elements or sub-routines containing processor instructions for a variety of different tasks, for example, for: communicating with the user via the MMI 312; and processing signalling messages (e.g. paging signals) received from the core network 218. Specific program elements stored in program memory 314 include a private cell selection element 316 for selecting a private cell for providing communication with the UE 300. The operation of the private cell selection element 316 will be described in more detail below.

The UE 300 further comprises a memory 318 for storing information. The memory 318 is shown in FIG. 3 as being part of the processing unit 302 but may instead be separate to the processing unit 302.

The UE 300 further comprises a removable module (represented by the dotted box 320 in FIG. 3), and an interface 322 coupled to the processing unit 302 for interfacing between the removable module 320 and the processing unit 302. The removable module 320 may be a Subscriber Identity Module (SIM) card or a Universal Integrated Circuit Card (UICC) which, stores network specific information used to authenticate and identify the subscriber on the communication system 200 (and/or other systems) to control access. In this case, the interface 322 is a SIM or UICC interface. The UICC card is the name of the standardised platform that can run several telecom applications such as the USIM application for a 3G network, or the SIM application for a 2G network, or others. The UICC card was introduced with the release 99 of the 3GPP standards, and replaces the SIM platform (that has GSM capabilities only). The term UICC card will be used for the rest of the document to designate the Integrated Circuit Card (ICC) used in a mobile phone for the support of the telecom applications such as USIM, SIM, and ISIM.

In addition, the UICC card 320, may also store CSG cell information for the UE 300 including a list of allowed CSG cells with which the UE may establish communication, such as a list of the CSG Identities of the allowed CSG cells which is referred to as the Allowed CSG list, and may also include a user defined list of the allowed CSG cells, such as a list of the CSG Identities of the allowed CSG cells selected by the user which is referred to as the User CSG list. The CSG cell information may also include the CSG type for the CSG cells in the lists. The Allowed CSG list is provided by the core network 218 based on the subscription of the UE 300. The User CSG list is defined by the user, for example, by manual selection of an allowed CSG cell or by including the most frequently visited allowed CSG cells. When a new CSG cell which is not in the Allowed CSG list is selected by a user, the new CSG cell may be added to the Allowed CSG list and the User CSG list by the core network 218 once the core network 218 determines that the new CSG cell is a valid cell (for example when security criteria is met or a roaming agreement is in place).

The CSG cell information may additionally or alternatively be stored in the memory 318. If the CSG cell information is stored in both the memory 318 and the UICC card 320, the CSG cell information stored in the memory 318 may be ignored i.e. the CSG cell information stored in the UICC card 320 takes precedence over the CSG cell information stored in the memory 218. The CSG type is stored in text and/or graphical format.

When a UE 300 camps on a CSG cell with a CSG Identity that is part of the UE's Allowed CSG list and has an associated CSG type stored in the UICC 320 or memory 318, the UE 300 may display for the user via the MMI 312 the associated type of the CSG cell.

The CSG cell information for the UE 300 is controlled by the operator of the communication system 200 and initial CSG cell information is stored in the UE 300 during initial programming of the UE 300. The CSG cell information for the UE 300 is also stored in the core network 218 in a database element 219 which stores all the CSG cell information for UEs having subscriptions with the communication system 200. Thus, for each of the UEs, the network stores the Allowed CSG list and the User CSG list and may also store the CSG type for the CSG cells in the lists in the database element 219.

The CSG cell information for the UE 300 may be subsequently changed by the operator (for example to provide and/or update a User CSG list) which results in the CSG cell information for the UE 300 stored in the database element 219 being updated and the CSG cell information stored in the UE 300 being updated, for example by Over-The-Air (OTA) programming using for example a Device Management (DM) protocol defined by the Open Mobile Alliance (OMA).

It is possible that a CSG identity stored in different UEs may either be associated with the same CSG Type or with different CSG Types. For example, the CSG identity of a first UE's home HeNB will have CSG type of "Home" with respect to the first UE, but CSG type of "Neighbour/Friend" on a neighbour's UE. The association of CSG type with a CSG cell (e.g. CSG Identity) for a particular UE can be determined by the operator, based on a variety of rules/policies, such as roaming agreement, or the request of CSG managers.

The association of CSG type with a CSG cell in the Allowed CSG list can be provided to the UE through initial UE configuration, or OTA and device management. When a manual selection of a CSG cell is performed successfully and a CSG Identity of a CSG cell is added into the User CSG list, the network can also assign a CSG type to be associated with the CSG identity, either in the message acknowledging the acceptance of manual selection or in a separate message.

A user may also choose another CSG type for a CSG Identity and propose the change to the network. The network can accept or reject the proposal.

The UE 300, once turned on or powered-up, may be in one of several operating modes in relation to the communication system 200, such as idle mode, or active mode. In the idle mode, the UE 300 is active with (that is, registered to) the communication system 200 but no communication resources have been allocated to the UE 300. In other words, there is no CS or PS or IMS connection between the UE 300 and the communication system so that the UE 300 will not receive or transmit services, video, multimedia or voice data in a voice or data call. In the idle mode, the communication system 200 communicates with the UE 300 by sending signalling information, such as paging signals or blocks to the UE 300 and the UE 300 is arranged to monitor for such signalling information from the communication system. The signalling information includes, for example, information that alerts the UE 300 to an incoming call, or information that provides system parameters to the UE 300 for determining the operation of the UE when operating with the communication system.

In the active mode, communication resources are allocated to the UE 300 and a CS or PS or IMS connection is established between the UE 300 and the active network in the communication system 200 which allows for the UE 300 to transmit or receive services.

When the UE 300 is in idle mode and moves out of the CSG cell with which it was last registered, or on turn on of the UE 300, the UE 300 performs a CSG cell selection procedure in order to select a CSG cell for providing communication to the UE under the control of the CSG cell selection element 316.

As discussed above in the introduction, automatic CSG cell selection typically uses the radio signal strength provided by the H(e)NBs at a particular location in order to select a CSG cell, with the H(e)NB providing the strongest signal being selected. In the example shown in FIG. 2 and with the UE 222 in idle mode and located at home in the home CSG cell 208, if the radio signal strength provided by the H(e)NB 214 of the open CSG cell 206 is greater than the radio signal strength provided by the home H(e)NB 216, then when the UE 222 selects a CSG cell for communication, the H(e)NB 214 may be selected and the UE 222 registered to the CSG cell 206 rather than the home CSG cell 208.

In order to improve the process of CSG cell selection, the inventors of the subject application have introduced a CSG priority indicator or priority value which is used in the CSG cell selection process in accordance with the disclosure. For example, the CSG priority value for the home CSG cell 208 and a home H(e)NB 216 may be arranged to have a priority value indicating the highest priority so that as long as the UE 222 is within the coverage of the home H(e)NB 216 defined by the home CSG cell 208, the UE 222 shall stay with the user's H(e)NB 216 even when there are other CSG cells 206 with H(e)NBs 214 providing better radio signals than the radio signals provided by the home H(e)NB 216.

Figures 4, 5, 6:
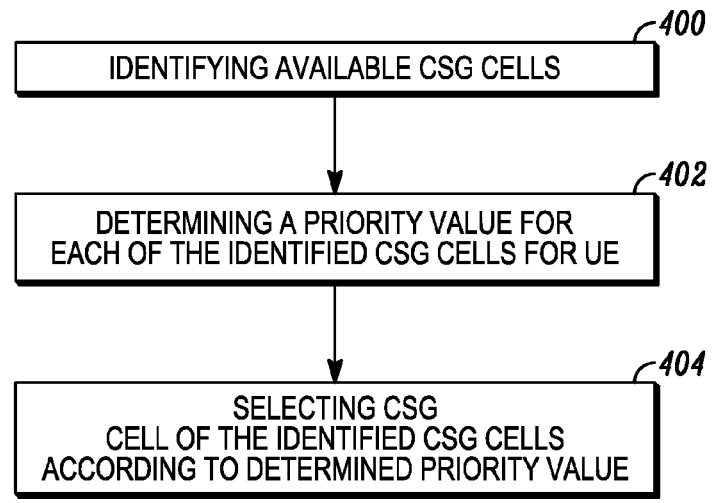
FIG. 4 is a flow diagram showing an example method of selecting a private cell in accordance with an embodiment of the disclosure for providing communication to a communication device in the communication system of FIG. 2.
FIG. 5 is a representation of an example format for a priority value information element in accordance with the present disclosure.
FIG. 6 is a representation of another example format for a priority value information element in accordance with the present disclosure.

An example method of selecting a CSG cell for providing communication to a UE in a communication system (such as communication system 200) comprising a plurality of CSG cells 202-208 will now be described with further reference to FIG. 4.

The example method comprises identifying CSG cells available to the UE for establishing communication, step 400. For example, this includes scanning radio signals received from H(e)NBs in the vicinity of the UE and performing measurements to determine the available CSG cells which meet the minimum radio requirements which are necessary in order to provide communication to the UE. A priority value from a plurality of priority values is then determined for each of the identified private cells for the UE, step 402. A CSG cell from the identified CSG cells is then selected according to the determined priority values of the identified private cells, step 404. Communication may then be established with the selected CSG cell. For example, the UE transmits to the core network 218 the identity (e.g. CSG Identity) of the selected CSG cell and its priority value and the core network 218 then determines, based on the CSG cell information stored in the database element 219 for the UE, whether the selected CSG cell is a valid CSG cell and whether the priority value determined by the core network 218 is the same as the priority value determined by the UE. If the core network 218 determines that the selected cell is valid and the determined priority values correspond, then communication will be established. If the core network 218 determines that the selected CSG cell is not valid or the priority value of the CSG cell determined by the UE is not the same as the priority value determined by the core network 218, then the core network 218 will initiate an update of the CSG cell information stored in the UE and the scanning process may be repeated to identify available CSG cells and determine their priority values. In the case when the network determines that the selected CSG cell is invalid (e.g. due to security reasons) but the selected CSG cell is included in the User CSG list, then the CSG cell Identity is removed from the User CSG list.

In an alternative arrangement, the UE may send the CSG Identities of all the identified available CSG cells and their priority values to the network and the network selects a CSG cell from the identified CSG cells based on the priority values.

In an embodiment, a priority value for each of the identified CSG cells may be determined according to the predetermined type associated with the identified CSG cell for the UE. The predetermined type of an identified CSG cell for the UE may include one of the following different predetermined types: a closed private cell, an open private cell, a home private cell, a hybrid private cell, and a visitor private cell. The predetermined type may correspond to the CSG Type defined in TS22.220. In other words, the predetermined type may be an indicator provided by the UE that is configured by the operator. The predetermined type may provide information to the user relating to the CSG cell for the UE, for example, information relating to at least one of the following: billing rate for use of the CSG cell by the UE, capabilities that may be provided (i.e. are available) by the H(e)NB by the CSG cell for the UE, QOS that may be provided (i.e. is available) by the H(e)NB by the CSG cell for the UE.

The step of determining the priority value may include determining for each of the identified CSG cells a priority value from a plurality of priority values according to the predetermined type associated with the identified CSG cell for the UE and according to whether the identified CSG cell is included in the list of allowed CSG cells (such as the Allowed CSG list).

In the case when a user defined list of the allowed private cells (such as the User CSG list) is provided, the priority value of an identified CSG cell may also be dependent on whether the identified CSG cell is included in the User CSG list or the Allowed CSG list or is included in both the User CSG list and the Allowed CSG list.

The CSG cell information stored in the UE and the database element 219 includes the Allowed CSG list, the User CSG list and the type of the CSG cells in the list and thus, the priority value for an identified CSG cell may be determined in the UE and/or the core network 218 based on the CSG cell information for the identified CSG cell for the UE. The priority value may be determined when needed based on the CSG cell information and may not be communicated between the UE and the network. In this case the CSG cell information is communicated and from the CSG cell information, the priority value determined. Alternatively, the priority values may be stored as part of the CSG cell information in the UE and/or as part of the network CSG cell information for the UE in the database element 219.

An example of possible values for the priority value in accordance with the disclosure are listed in the Table 1 below:

TABLE 1

| Priority Value | CSG Type | User CSG list | Allowed CSG list |
|---|---|---|---|
| 7 | 1 | 1 | 1 |
| 6 | 1 | 1 | 0 |
| 5 | 1 | 0 | 1 |
| 4 | 1 | 0 | 0 |
| 3 | 0 | 1 | 1 |
| 2 | 0 | 1 | 0 |
| 1 | 0 | 0 | 1 |
| 0 (Manual selection) | 0 | 0 | 0 |

Note: For the User CSG list and the Allowed CSG list column in Table 1, a value '1' indicates that the CSG cell is in the respective list and a value '0' indicates that the CSG cell is not in the respective list. For the CSG Type column in Table 1, a value '1' indicates that the type of the CSG cell is a home CSG cell or another type of CSG cell with a low billing rate (that is a type of CSG cell that has a higher priority) and a value '0' indicates that the type of the CSG cell is not a home CSG cell or is another type of CSG cell with a high billing rate (that is a type of CSG cell that has a lower priority). A CSG cell can be in both the User CSG list and Allowed CSG list as a result of a user performing a manual selection on a CSG cell whose CSG Identity is in the Allowed CSG list.

When the CSG type of the identified CSG cell is "Home CSG (low billing rate CSG)" and CSG is also in the User CSG list (e.g. which contains the most frequently used CSG list), and Allowed CSG List (which contains the operator's Allowed CSG list, e.g. with CSG roaming agreement), the priority value represents the highest priority (priority value or CSGPriorityIndicator=7).

When the CSG type of the identified CSG cell is "Home CSG (low billing rate CSG)" and CSG is also in the User CSG list (e.g. which contains the most frequently used CSG list), the priority value represents the second highest priority (priority value or CSGPriorityIndicator=6).

When the CSG type of the identified CSG cell is "Home CSG (low billing rate CSG)" and CSG is also in the operator Allowed CSG list (which contains the operator's Allowed CSG list and has CSG roaming agreement), the priority value represents the third highest priority (priority value or CSGPriorityIndicator=5).

When the identified CSG cell is in the User CSG list (e.g. which contains the most frequently used CSG list)" and also is in the operator Allowed CSG list (which contains the operator's allowed CSG list and has CSG roaming agreement), the priority value represents the fifth highest priority (priority value or CSGPriorityIndicator=3).

When the identified CSG cell is in the User CSG list (e.g. users would have used this CSG before and will therefore know the billing rates and the user is a member of this CSG), the priority value represents the sixth highest priority (priority value or CSGPriorityIndicator=2).

When the identified CSG cell is in the operator Allowed CSG list (which contains the operator's allowed CSG list and has CSG roaming agreement), the priority value represents the next to last priority (priority value or CSGPriorityIndicator=1). In this case the operator's Allowed CSG list is "1", mobile users would know this is recommended CSG by user's operator and user home PLMN operator already has roaming agreement with this CSG. It is therefore safe and secure to use.

When the identified CSG cell is not associated to any of the three criteria in Table 1 (that is, the CSG type is '0' and the identified CSG cell is not in the Allowed CSG list nor the User CSG list, the priority value represents the lowest priority (priority value or CSGPriorityIndicator=1). In this case, the user can only do a manual selection to select this CSG cell and the core network of the home PLMN decides whether the user can access this identified CSG cell.

Thus, by using a priority value or CSGPriorityIndicator determined for each identified CSG cell to select a CSG cell, the method in accordance with the disclosure can provide a way for users to stay on their home CSG cell (e.g. low billing rate CSG) or other preferred CSG cell. The priority value may be determined for each CSG cell, based on its CSG type, whether or not it is in the User CSG list, and whether or not it is in the Allowed CSG list. In an embodiment, the priority value is arranged so that it is first ordered by CSG type. In other words, the priority value of a CSG cell is determined first by the CSG type of the identified cell and then according to whether it is in the User CSG list and then whether it is in the Allowed CSG list. There can be multiple CSG types with pre-defined priority order. For example (with the highest priority first), "Home CSG (Low Billing Rate)">"Preferred (User CSG List)">"Roaming Partner (Allowed CSG List)". Within each CSG type, the CSG cell with a CSG Identity in the User CSG list would have higher priority.

Thus, by selecting cells based on a priority value, the method in accordance with the disclosure enables a UE to select and remain in communication with a home CSG cell or other preferred (e.g. low billing rate) CSG cell irrespective of the radio signal strengths of other CSG cells which may otherwise cause the UE to reselect another CSG cell according to radio signal strength at anytime.

Furthermore, by selecting cells based on a priority value, the method in accordance with the disclosure enables a UE to select and stay on the user's home CSG cell or other preferred (e.g. low billing rate) CSG cell and thus avoids the UE having to stay on a more expensive billing rate CSG cell.

Furthermore, by selecting cells based on a priority value, the method in accordance with the disclosure avoids a problem which may arise when a UE does not know which list (Allowed CSG list or User CSG list) should be used first in idle mode. It may result in different implementations by UE manufacturers if the priority of the Allowed CSG list and User CSG list is pre-configured.

CSG cell information (including the CSG Identity and CSG type for each CSG cell and in some example arrangements, the priority value for each CSG cell for a UE) for the CSG cells in the Allowed CSG list and the User CSG list is stored in the UE 300 (memory 318 and/or UICC card 320) and CSG cell information for each UE is stored in a network element such as database element 219 of the communication system 200 (the CSG cell information stored in the database element 219 will be referred to hereinafter as network CSG cell information). The network CSG cell information may be updated (e.g. to add or remove CSG cells from the Allowed CSG list and/or to add or remove the User CSG list and/or to change the CSG type (e.g. when billing rates change) and/or to change the priority value) at times by the operator. In order that the CSG cell information for a UE stored in the UE corresponds or is synchronised to the network CSG cell information for the UE stored in the database element 219, the CSG cell information stored in UE may be synchronised or updated with the network CSG cell information.

An example method of synchronising in accordance with the disclosure comprises in response to selecting an identified CSG cell, sending a signalling message by the UE to the network, such as core network 218. The signalling message includes the identity of the identified private cell. A response message is then sent by the core network 218 to the UE and received at the UE in response to the signalling message. The CSG cell information for the identified CSG cell stored in the UE may then be updated based on information in the response message. For example, the response information in the response message may indicate that the CSG cell information needs updating with CSG cell information in the response message or the response information in the response message may indicate no update is required.

In an example, the signalling message and response message are based on a non-access stratum (NAS) signalling protocol. Other signalling protocols may also be used.

The introduction of a new signalling information elements (e.g. information elements provided in the signalling message and response information provided in the response message) within the existing construct of the 3GPP TS 24.301 (the disclosure of which is incorporated herein by reference) NAS signalling protocol enables existing mobility management procedures to be enhanced and reused in order to synchronize the CSG cell information (and hence the priority values) between the UE and network without the need to define completely new mobility management messages and message flow procedures.

The response information element within network-generated NAS mobility management messages enable the network to provide the UE with the network CSG cell information for the current serving cell from which the priority value can be determined. The UE would in turn compare the priority value determined from the network CSG cell information with the priority value determined from the CSG cell information stored in the UE (or if stored the priority value stored in the UE). If the priority value determined from the network CSG cell information matches the priority value determined from the UE's locally stored CSG cell information, the UE takes no further action. However, if the priority values do not match, the UE updates its' locally stored CSG cell information with the network CSG cell information received from the network. The UE will then use this updated CSG cell information in subsequent prioritization of CSG cells.

Alternatively, the response information element within network-generated NAS mobility management messages may include a priority value information element for indicating the priority value for an identified CSG as determined by the network from the network CSG cell information for the current serving cell. The UE would then compare the priority value received from the network with a priority value determined from the CSG cell information stored in the UE. In this case, the priority value information element may take the form of either a single or double octet information element of the "tagged-value" (TV) format used within 3GPP TS 24.301 (the disclosure of which is incorporated herein by reference). The format for the single and double octet information elements are shown in FIGS. 5 and 6, respectively.

The priority value information element includes a CSG priority information element identifier (IEI) (or CSGPriorityIndicator information element identifier (IEI)) which may be either an 8- or 4-bit value used to distinguish the information element from all other elements defined within TS 24.301. The particular length and coded value would be assigned by 3GPP.

The priority value information element also includes a CSG priority field (or CSG PriorityIndicator field) which contains the value of the priority value for the given serving cell. The format of the CSGPriorityIndicator field is shown as 4 bits within FIGS. 5 and 6. This is for illustrative purposes only and other numbers of bits (e.g. more or less than 4 bits) may be used depending on the number of priorities required to be defined. For example, the definition of additional CSG priorities would allow a finer degree of prioritization.

Figure 7:
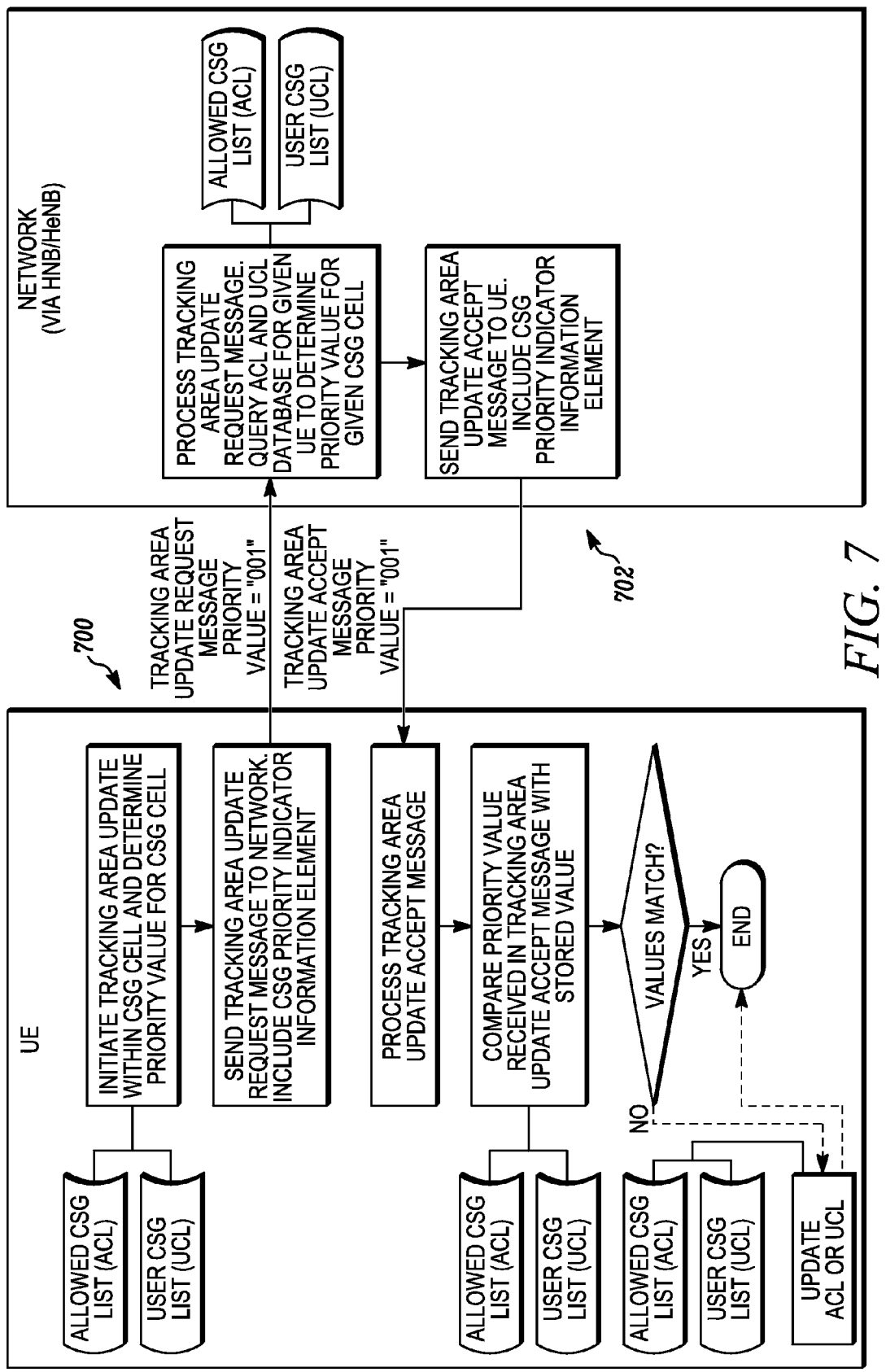
FIGS. 7-8 are diagrams showing example message flows between the communication device and network of the communication system of FIG. 2 for a first synchronisation mode in accordance with the present disclosure.
Figure 8:
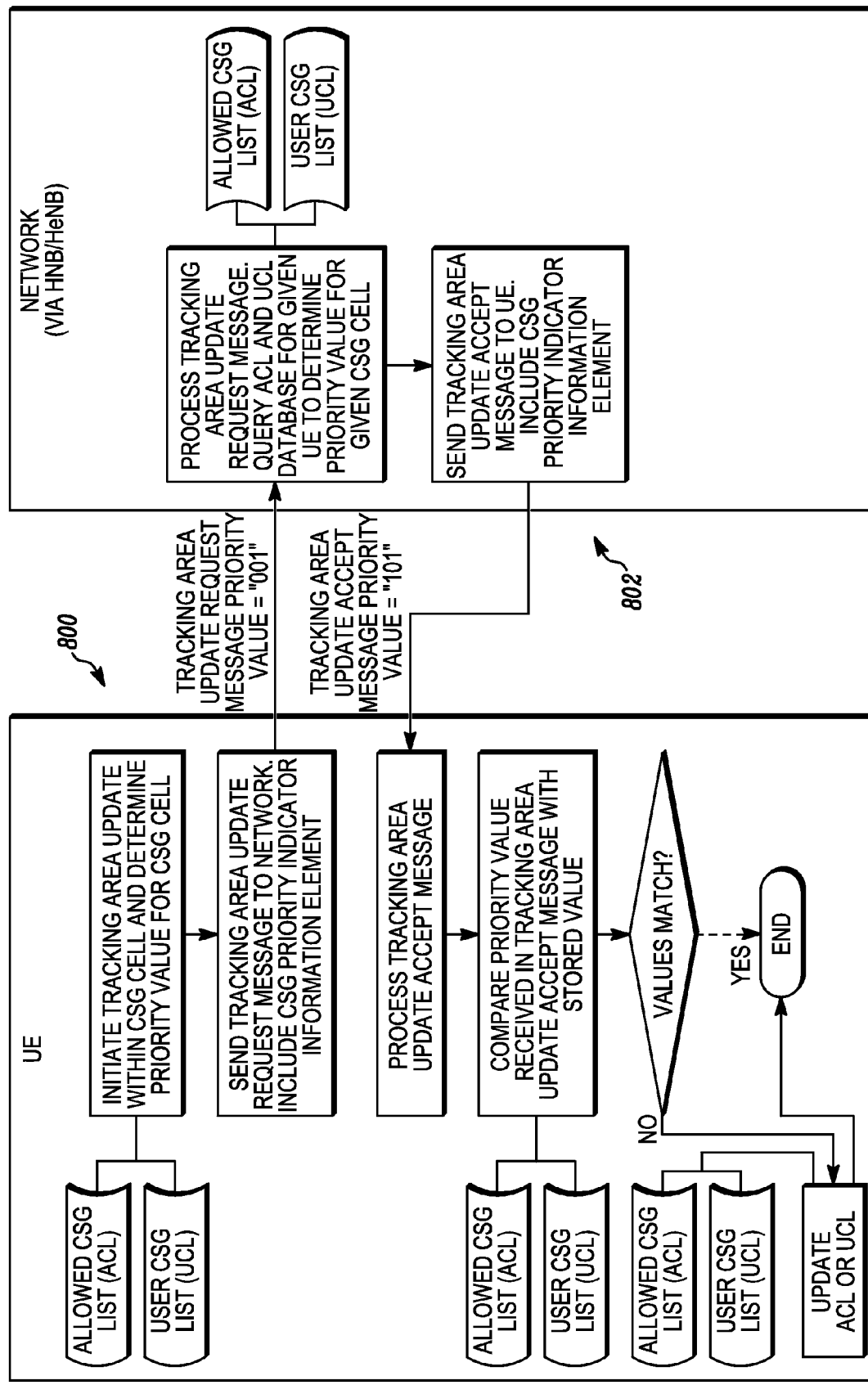
Figure 9:
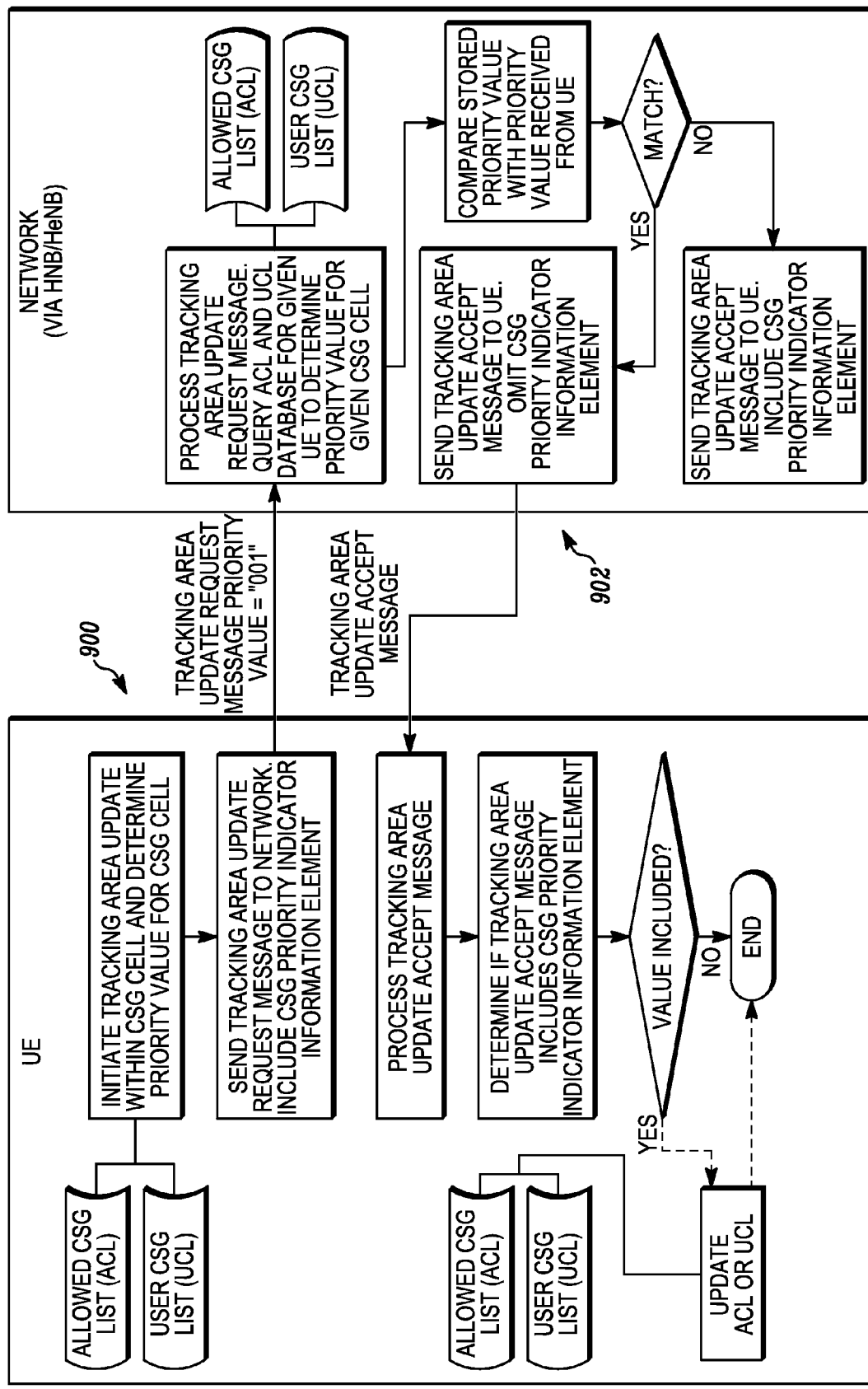
FIGS. 9-10 are diagrams showing example message flows between the communication device and network of the communication system of FIG. 2 for a second synchronisation mode in accordance with the present disclosure.
Figure 10:
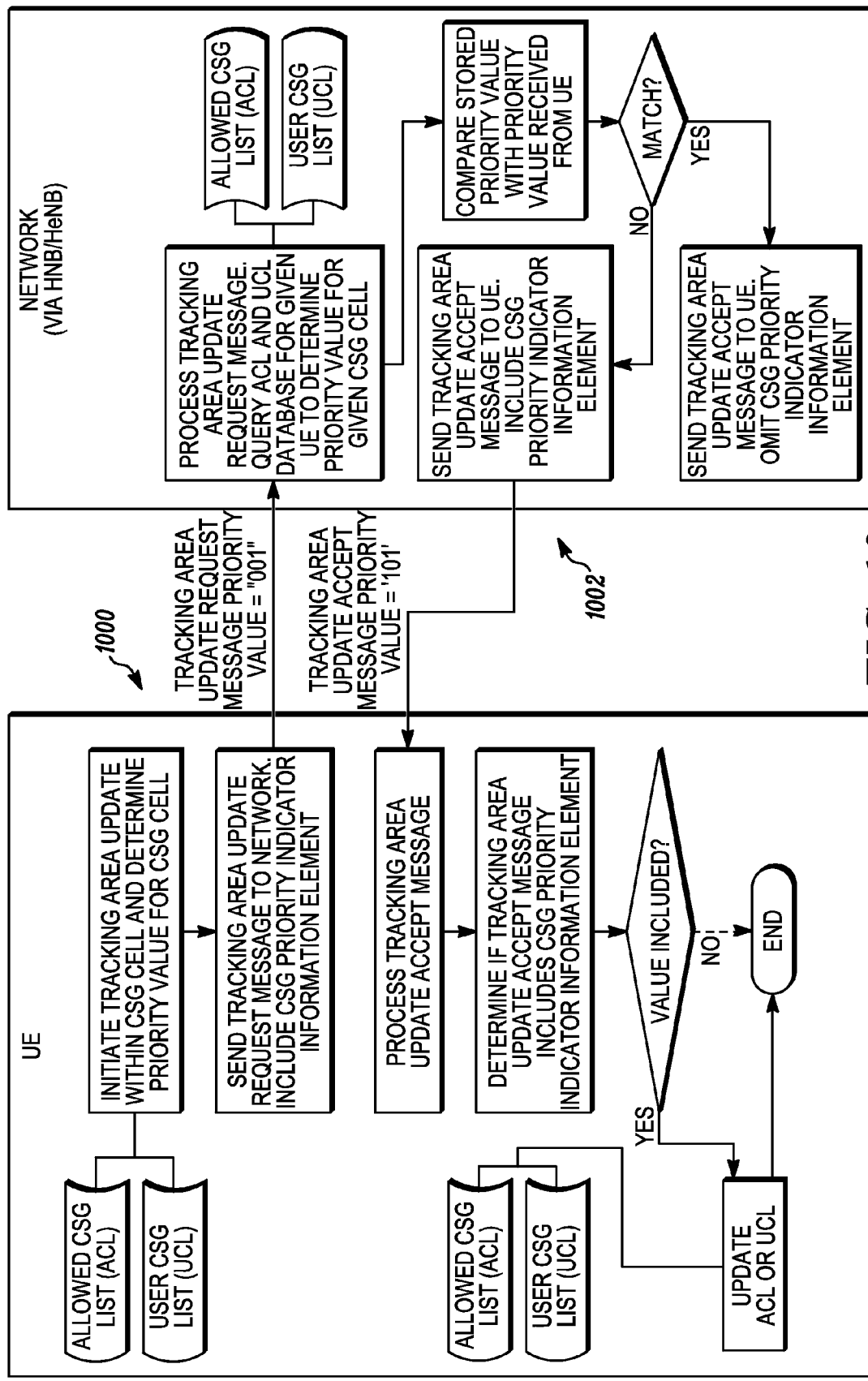
Figure 11:
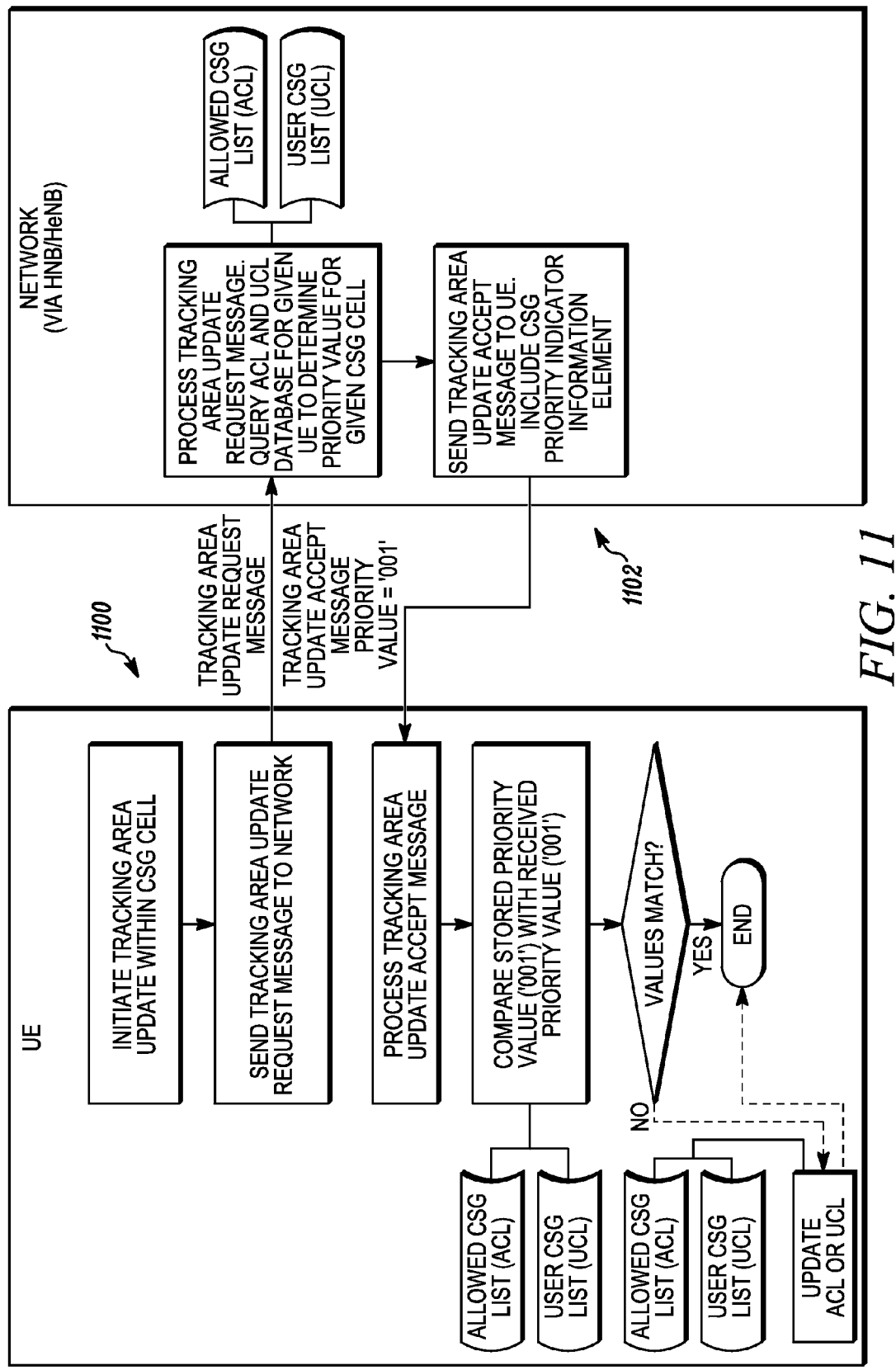
FIGS. 11-12 are diagrams showing example message flows between the communication device and network of the communication system of FIG. 2 for a third synchronisation mode in accordance with the present disclosure.
Figure 12:
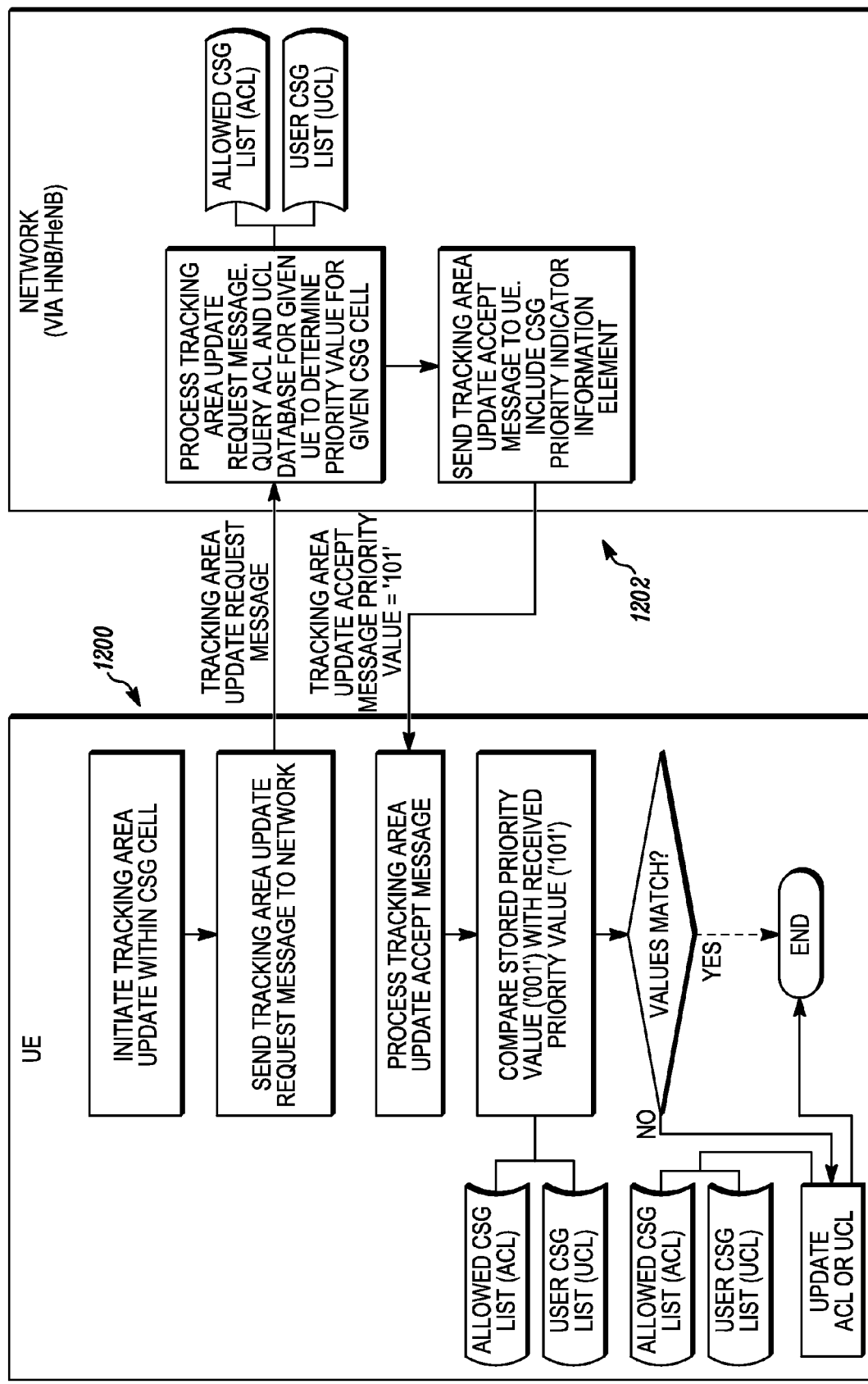

The communication of the priority value information elements (CSGPriorityIndicator information elements) may follow one of three modes:
1. UE indication with network reply
2. UE indication with conditional network reply
3. Network-only indication FIGS. 7-8 are diagrams showing example message flows between the UE and the network via the H(e)NB for the UE indication with network reply mode. FIGS. 9-10 are diagrams showing example message flows between the UE and the network via the H(e)NB for the UE indication with conditional network reply mode. FIGS. 11-12 are diagrams showing example message flows between the UE and the network via the H(e)NB for the UE indication with network-only indication mode.

In the "UE indication with network reply" mode, the UE includes a stored value of the priority value for the given cell, determined by the UE from the CSG type of the given cell, the User CSG list and Allowed CSG list stored in the UE, within the CSGPriorityIndicator information element included in a NAS message such as a TRACKING AREA UPDATE, SERVICE REQUEST, or ATTACH message as defined in 3GPP TS 24.301, step 700 in FIG. 7. In the example flow in FIG. 7, the priority value in the CSGPriorityIndicator information element from the UE is '001'. Upon receiving any of these messages which include a CSGPriorityIndicator information element, the network responds with the appropriate NAS response message (such as TRACKING AREA UPDATE ACCEPT, TRACKING AREA UPDATE REJECT, SERVICE REQUEST ACCEPT, SERVICE REQUEST REJECT, ATTACH ACCEPT, or ATTACH REJECT) with the priority value for the given UE for the given CSG cell as determined by the network (from the CSG type of the given cell, the User CSG list and Allowed CSG list as stored in the database element 219) in the CSGPriorityIndicator information element, step 702. In the example flow in FIG. 7, the priority value in the CSGPriorityIndicator information element from the network is '001'. When the UE compares the stored priority value with the priority value received from the network, the UE determines there is a match and the synchronisation process ends and no update occurs.

In the example flow in FIG. 8, the priority value in the CSGPriorityIndicator information element sent from the UE in step 800 is '001'. However, the priority value in the CSGPriorityIndicator information element sent from the network in step 802 is '101'. When the UE compares the stored priority value with the priority value received from the network, the UE determines there is not a match and the CSG cell information stored in the UE is updated with the network CSG cell information (including the priority value 101) received from the network.

In the "UE indication with conditional network reply" mode, as with the "UE indication with network reply" mode, the UE includes its stored value of the priority value for the given cell (determined by the UE from the CSG type of the given cell, the User CSG list and Allowed CSG list stored in the UE), within the CSGPriorityIndicator information element included in one of the previously listed NAS messages sent to the network, step 900 in FIG. 9. In this mode, however, the network includes the network determined value of the priority value with the CSGPriorityIndicator information element contained within the appropriate NAS response message only if it differs from the priority value provided by the UE. The network must therefore compare the priority value received from the UE with the priority value determined by the network for the given UE for the given CSG cell and act accordingly. FIG. 9 shows the example case when the priority values match and so no priority value is provided by the network to the UE at step 902 and no update of the CSG cell information stored in the UE is required. FIG. 10 shows the example case when the priority values do not match (the priority value determined by the UE is '001' and the priority value determined by the network is '101') and so the network determined priority value 101 is sent to the UE by the network at step 1002. The UE then determines there is not a match and the CSG cell information stored in the UE is updated with the network CSG cell information (including the priority value '101') received from the network.

In the third mode of operation, "Network-only indication", the UE does not provide its stored value of the priority value within any NAS message. The network, however, upon receipt of one of the NAS messages listed for the "UE indication with network reply" mode (and sent by the UE in step 1100 in FIG. 11 and step 1200 in FIG. 12) responds to the UE with appropriate NAS response messages and includes the network determined value of the priority value for the given UE and serving CSG cell within the CSGPriorityIndicator information element. In the example flow in FIG. 11, the priority value in the CSGPriorityIndicator information element from the network is '001'. When the UE compares the stored priority value (in the case of FIG. 11, the stored priority value is '001') with the priority value received from the network, the UE determines there is a match and the synchronisation process ends and no update occurs. In the example flow in FIG. 12, the priority value in the CSGPriorityIndicator information element from the network is '101'. When the UE compares the stored priority value (in the case of FIG. 12, the stored priority value is '001') with the priority value received from the network, the UE determines there is not a match and the CSG cell information stored in the UE is updated with the network CSG cell information (including the priority value '101') received from the network.

Thus, in all three modes of operation, upon receipt of a CSGPriorityIndicator information element from the network in a response message, the UE compares the priority value contained within the received CSGPriorityIndicator information element with the priority value stored within the UE (either in memory 318 or UICC card 320). If the received priority value differs from the UE stored priority value, the UE updates its stored value to the received value and uses the newly stored value in subsequent CSG cell selection or prioritization operations. If the received priority value matches the UE stored priority value, or in the case of the "UE indication with conditional network reply" mode of operation in which no CSGPriorityIndicator information element is received from the network, the UE considers its stored priority value as valid for the given serving CSG cell and uses that priority value in subsequent CSG cell selection or prioritization procedures.

Thus, the CSG cell information stored in the UE may be updated or synchronised to the CSG cell information stored in the network using signalling messages rather than having to wait for the next OTA device management update session (e.g. according to the OMA protocol). For example, when a UE manually selects a new CSG cell, the NAS signalling messages between the UE and network can be used to confirm to the UE that the new CSG cell is valid and the priority value for the new CSG cell in a timely manner rather than having to wait for the next OTA device management update session. If the CSG cell information stored in the UE is updated or synchronised via the NAS messages, the network knows that the updated CSG cell information has been provided to the UE and so at the next OTA device management update session, the same information will not need to be sent again. Thus, this aspect of the disclosure ensures a simple and time efficient way in which to keep the CSG cell information in the UE synchronised to the CSG cell information in the network.

It is noted that the term 'cell' as used herein is not intended to limit the disclosure to a cellular communication system but should be interpreted broadly as meaning a communication area served by one or more base stations such that a communication device located anywhere in the communication area or cell may communicate with at least one of the one or more of the base stations.

It will be appreciated that the core network 218 may manage additional or alternative radio access networks RANs to the UTRAN/EUTRAN. Examples of other RANs include GSM access network (including GSM/EDGE RAN (GE-RAN)), CDMA 1X, CDMA EV-DO, HSPA (HSDPA/HSUPA) access networks, WLAN access network, Wi-Max access network.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture and method which is presented merely to provide a useful reference in discussing various aspects of the disclosure. Of course, the description of the architecture and method has been simplified for purposes of discussion, and it is just one of many different types of appropriate architectures and methods that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A method of selecting a private cell for providing communication to a communication device in a communication system comprising a plurality of private cells, the method comprising:
   identifying private cells available to the communication device for establishing communication;
   determining a priority value from a plurality of priority values for each of the identified private cells for the communication device; and
   selecting a private cell for providing communication from the identified private cells according to the determined priority values of the identified private cells.

2. The method of claim 1, wherein each private cell of the plurality of private cells is associated with a predetermined type of private cell for the communication device, wherein determining includes determining for each of the identified private cells a priority value from a plurality of priority values according to the predetermined type associated with the identified private cell for the communication device.

3. The method of claim 2, wherein the predetermined type associated with a private cell provides information relating to the private cell for the communication device including information relating to at least one of the following: billing rate for use of the private cell, capabilities available by the private cell, Quality of Service available by the private cell.

4. The method of claim 2, wherein each private cell of the plurality of private cells is associated with a predetermined type for the communication device of a plurality of different predetermined types, the different predetermined types including a closed private cell, an open private cell, a home private cell, a hybrid private cell, and a visitor private cell.

5. The method of claim 2, further comprising providing a list of allowed private cells with which the communication device may establish communication and wherein determining includes determining for each of the identified private cells a priority value from a plurality of priority values according to the predetermined type associated with the identified private cell for the communication device and according to whether the identified private cell is included in the list of allowed private cells.

6. The method of claim 5, further comprising providing a user defined list of the allowed private cells by selecting by a user of the communication device at least one of the allowed private cells and wherein the priority value of an identified private cell is dependent on whether the identified private cell is included in the user defined list of private cells or the list of allowed private cells or is included in both the user defined list and the list of allowed private cells.

7. The method of claim 5, further comprising storing private cell information in the communication device for the allowed private cells, the private cell information including for each allowed private cell an identity of the allowed private cell and the predetermined type of private cell associated with the allowed private cell for the communication device, and wherein determining includes determining a priority value using the stored private cell information.

8. The method of claim 7, further comprising:
   storing network private cell information for the allowed private cells of the communication device in a network element of the communication system, the network private cell information including for each allowed private cell an identity of the allowed private cell and the predetermined type of private cell associated with the allowed private cell for the communication device; and
   synchronising the private cell information stored in the communication device with the network private cell information.

9. The method of claim 8, wherein synchronising comprises:
   in response to selecting an identified private cell, sending a signalling message by the communication device to the network, the signalling message including the identity of the identified private cell;
   receiving at the communication device a response message from the network in response to the signalling message; and
   updating the private cell information for the identified private cell stored in the communication device based on response information provided in the response message.

10. The method of claim 9, wherein the signalling message and response message are based on a non-access stratum (NAS) signalling protocol.

11. The method of claim 10, wherein each of the signalling message and the response message includes a priority value information element including a CSG priority information element indicator for identifying the priority value information element from other information elements and a CSG priority field for containing a priority value.

12. The method of claim 9, wherein the signalling message further includes the priority value for the identified private cell determined by the communication device, wherein the response message includes a priority value for the identified private cell for the communication device determined by the network based on the network private cell information for the identified private cell, and wherein updating includes replacing the priority value for the identified private cell determined by the communication device with the priority value in the response message when the priority value sent in the signalling message is different to the priority value determined by the network.

13. The method of claim 9, wherein the signalling message further includes the priority value for the identified private cell determined by the communication device, wherein the response message includes a priority value for the identified private cell for the communication device determined by the network based on the network private cell information for the identified private cell when the priority value sent in the signalling message is different to the priority value determined by the network, and wherein updating includes replacing the priority value for the identified private cell determined by the communication device with the priority value in the response message.

14. The method of claim 9, wherein the response message includes a priority value for the identified private cell for the communication device determined by the network based on the network private cell information for the identified private cell, and wherein updating includes replacing the priority value for the identified private cell determined in the communication device with the priority value in the response message when the priority value sent in the signalling message is different to the priority value in the response message.

15. A communication device for communicating with a private cell in a communication system comprising a plurality of private cells, the communication device comprising:
  a communication section for providing wireless communication with at least one private cell;
  a processing unit coupled to the communication section, the processing unit being arranged in operation to:
    identify private cells available to the communication device for establishing communication;
    determine a priority value from a plurality of priority values for each of the identified private cells for the communication device; and
    select a private cell for providing communication from the identified private cells according to the determined priority values of the identified private cells.

16. The communication device of claim 15, wherein each private cell of the plurality of private cells is associated with a predetermined type of private cell for the communication device, wherein the processing unit is arranged in operation to determine for each of the identified private cells a priority value from a plurality of priority values according to the predetermined type associated with the identified private cell for the communication device.

17. The communication device of claim 16, wherein the predetermined type associated with a private cell provides information relating to the private cell for the communication device including information relating to at least one of the following: billing rate for use of the private cell, capabilities available by the private cell, Quality of Service available by the private cell.

18. The communication device of claim 16, being configured to store a list of allowed private cells with which the communication device may establish communication and wherein the processing unit is arranged in operation to determine for each of the identified private cells a priority value from a plurality of priority values according to the predetermined type associated with the identified private cell for the communication device and according to whether the identified private cell is included in the list of allowed private cells.

19. The method of claim 18, being further configured to store a user defined list of the allowed private cells, the user defined list including at least one of the allowed private cells selected by a user of the communication device and wherein the processing unit is arranged in operation to determine for each of the identified private cells a priority value according to the predetermined type associated with the identified private cell for the communication device and according to whether the identified private cell is included in the user defined list of private cells or the list of allowed private cells or is included in both the user defined list and the list of allowed private cells.

* * * * *